(12) United States Patent
Neumetzler

(10) Patent No.: US 8,016,617 B2
(45) Date of Patent: Sep. 13, 2011

(54) WIRE CONNECTION MODULE

(75) Inventor: Heiko Neumetzler, Berlin (DE)

(73) Assignee: ADC GmbH, Berlin (DE)

( * ) Notice: Subject to any disclaimer, the term of this patent is extended or adjusted under 35 U.S.C. 154(b) by 241 days.

(21) Appl. No.: 12/134,012

(22) Filed: Jun. 5, 2008

(65) Prior Publication Data

US 2008/0305674 A1 Dec. 11, 2008

(30) Foreign Application Priority Data

Jun. 5, 2007 (DE) .......................... 10 2007 026 096

(51) Int. Cl.
*H01R 13/648* (2006.01)
(52) U.S. Cl. .................... 439/620.08; 439/709; 439/922
(58) Field of Classification Search ................... 439/92, 439/404, 620.08, 620.27, 709, 922
See application file for complete search history.

(56) References Cited

U.S. PATENT DOCUMENTS

| | | | |
|---|---|---|---|
| 2,240,180 A | 4/1941 | Frank | |
| 2,762,030 A | 9/1956 | Scoville | |
| 4,146,755 A | 3/1979 | Causse | |
| 4,171,587 A | 10/1979 | Bullen, Jr. | |
| 4,283,103 A | 8/1981 | Forberg et al. | |
| 4,345,294 A | 8/1982 | Forberg et al. | |
| 4,504,883 A | 3/1985 | Uchida et al. | |
| 4,541,682 A | 9/1985 | Gerke et al. | |
| 4,547,034 A | 10/1985 | Forberg et al. | |
| 4,634,209 A | 1/1987 | Forberg et al. | |
| 4,647,121 A | 3/1987 | Dolansky et al. | |
| 4,741,711 A | 5/1988 | Singer, Jr. | |
| 4,790,770 A * | 12/1988 | Klaiber | 439/395 |
| 4,846,735 A | 7/1989 | Teichler et al. | |
| 4,871,330 A | 10/1989 | Muller et al. | |
| 4,975,066 A | 12/1990 | Sucheski et al. | |
| 4,975,069 A | 12/1990 | Fedder et al. | |
| 5,000,703 A | 3/1991 | Biederstedt et al. | |
| 5,033,974 A | 7/1991 | Biederstedt et al. | |
| 5,044,979 A | 9/1991 | Siemon et al. | |
| 5,086,368 A | 2/1992 | Gerke et al. | |

(Continued)

FOREIGN PATENT DOCUMENTS

DE 33 11 459 10/1984

(Continued)

OTHER PUBLICATIONS

U.S. Non-Final Office Action cited in U.S. Appl. No. 12/133,990 mailed Nov. 6, 2009.

(Continued)

*Primary Examiner* — James Harvey
(74) *Attorney, Agent, or Firm* — Merchant & Gould P.C.

(57) ABSTRACT

The invention relates to a wire connection module, comprising a two-part housing and a number of contact elements (10), the contact elements (10) having at least one connection side, which is in the form of a contact for connecting wires, the contact element (10) further having an interface, via which surge protection elements can be connected, the first housing part (2) being formed with receptacles (20, 21), into which two-pole surge arresters (24) are inserted, the contact element (10) has a contact face (13), which is in the form of an interface for the surge arrester, protrudes into the receptacle (20, 21) and makes contact with a first pole of the surge arrester (24), contact being made with the other pole of the surge arrester (24) by means of a ground element.

23 Claims, 6 Drawing Sheets

U.S. PATENT DOCUMENTS

| | | | |
|---|---|---|---|
| 5,157,580 A | 10/1992 | Hegner et al. | |
| 5,160,273 A | 11/1992 | Carney | |
| 5,163,855 A * | 11/1992 | Gerke et al. | 439/709 |
| 5,297,970 A | 3/1994 | Carney | |
| 5,318,461 A | 6/1994 | Frikkee et al. | |
| 5,451,170 A | 9/1995 | Suffi | |
| 5,492,478 A | 2/1996 | White | |
| 5,494,461 A | 2/1996 | Bippus et al. | |
| 5,549,489 A | 8/1996 | Baggett et al. | |
| 5,556,296 A | 9/1996 | Dussausse et al. | |
| 5,575,689 A | 11/1996 | Baggett et al. | |
| 5,596,475 A | 1/1997 | Figueiredo et al. | |
| 5,647,760 A | 7/1997 | Drach et al. | |
| 5,718,593 A | 2/1998 | Figueiredo et al. | |
| 5,722,850 A | 3/1998 | White | |
| 5,805,404 A | 9/1998 | Kane et al. | |
| 5,844,785 A | 12/1998 | Daoud et al. | |
| 5,923,238 A | 7/1999 | Polzehl et al. | |
| 6,068,503 A | 5/2000 | Gerke et al. | |
| 6,074,257 A | 6/2000 | Fasano | |
| 6,193,556 B1 | 2/2001 | Escane | |
| 6,346,005 B1 | 2/2002 | Viklund et al. | |
| 6,402,542 B1 | 6/2002 | Jones | |
| 6,556,411 B1 | 4/2003 | Hoeft et al. | |
| 6,582,247 B2 | 6/2003 | Siemon | |
| 6,654,223 B1 | 11/2003 | Bippus et al. | |
| 6,799,988 B2 | 10/2004 | Mansur | |
| 6,821,153 B2 | 11/2004 | Otto et al. | |
| 6,994,582 B1 | 2/2006 | Carney et al. | |
| 7,018,229 B2 | 3/2006 | Otto et al. | |
| 7,037,118 B2 | 5/2006 | Neumetzler et al. | |
| 7,056,147 B2 | 6/2006 | Arias et al. | |
| 7,121,870 B1 | 10/2006 | Chen | |
| 7,165,983 B1 | 1/2007 | Fasce et al. | |
| 7,207,818 B1 | 4/2007 | Barthes et al. | |
| 7,223,115 B2 | 5/2007 | Hashim et al. | |
| 7,270,551 B2 | 9/2007 | Busse et al. | |
| 7,322,847 B2 | 1/2008 | Hashim et al. | |
| 7,335,049 B2 | 2/2008 | Alarcon et al. | |
| 7,335,069 B1 | 2/2008 | Williams et al. | |
| 7,410,369 B2 | 8/2008 | Busse et al. | |
| 7,462,076 B2 | 12/2008 | Walter et al. | |
| 7,583,488 B2 | 9/2009 | Neumetzler et al. | |
| 7,722,403 B2 * | 5/2010 | Neumetzler | 439/620.08 |
| 7,722,404 B2 | 5/2010 | Neumetzler | |
| 7,762,833 B2 | 7/2010 | Neumetzler | |
| 7,883,374 B2 | 2/2011 | Neumetzler et al. | |
| 2003/0077934 A1 | 4/2003 | Mansur | |
| 2005/0106942 A1 | 5/2005 | Neumetzler et al. | |
| 2006/0030198 A1 | 2/2006 | Carney et al. | |
| 2007/0064373 A1 | 3/2007 | Neumetzler et al. | |
| 2008/0305661 A1 | 12/2008 | Neumetzler | |
| 2008/0305674 A1 * | 12/2008 | Neumetzler | 439/395 |
| 2008/0305684 A1 | 12/2008 | Neumetzler et al. | |
| 2008/0305686 A1 * | 12/2008 | Neumetzler | 439/630 |
| 2009/0011633 A1 | 1/2009 | Busse et al. | |
| 2009/0130890 A1 | 5/2009 | Neumetzler | |
| 2009/0130920 A1 | 5/2009 | Muller et al. | |
| 2009/0142941 A1 | 6/2009 | Neumetzler | |
| 2010/0112872 A1 * | 5/2010 | Neumetzler et al. | 439/709 |

FOREIGN PATENT DOCUMENTS

| | | |
|---|---|---|
| DE | 34 12 468 | 10/1985 |
| DE | 36 14 592 | 7/1987 |
| DE | 39 17 270 A1 | 11/1990 |
| DE | 44 23 339 | 9/1995 |
| DE | 296 01 998 U1 | 5/1996 |
| DE | 102 36 114 | 10/2001 |
| DE | 102 57 308 | 7/2004 |
| DE | 103 17 621 A1 | 11/2004 |
| DE | 103 41 694 | 2/2005 |
| DE | 10 2004 017 605 | 10/2005 |
| DE | 10 2004 061 681 A1 | 7/2006 |
| DE | 10 2007 006 693 | 8/2008 |
| EP | 0 667 650 B1 | 12/1994 |
| EP | 0 689 365 B1 | 5/1995 |
| GB | 2 129 628 | 5/1984 |
| WO | 2004/093275 | 10/2004 |
| WO | 2005/101587 | 10/2005 |
| WO | 2008/098607 | 8/2008 |

OTHER PUBLICATIONS

U.S. Non-Final Office Action cited in U.S. Appl. No. 12/134,000 mailed Jul. 14, 2009.

U.S. Notice of Allowance cited in U.S. Appl. No. 12/134,022 mailed Nov. 19, 2009 and Allowed Claims.

* cited by examiner

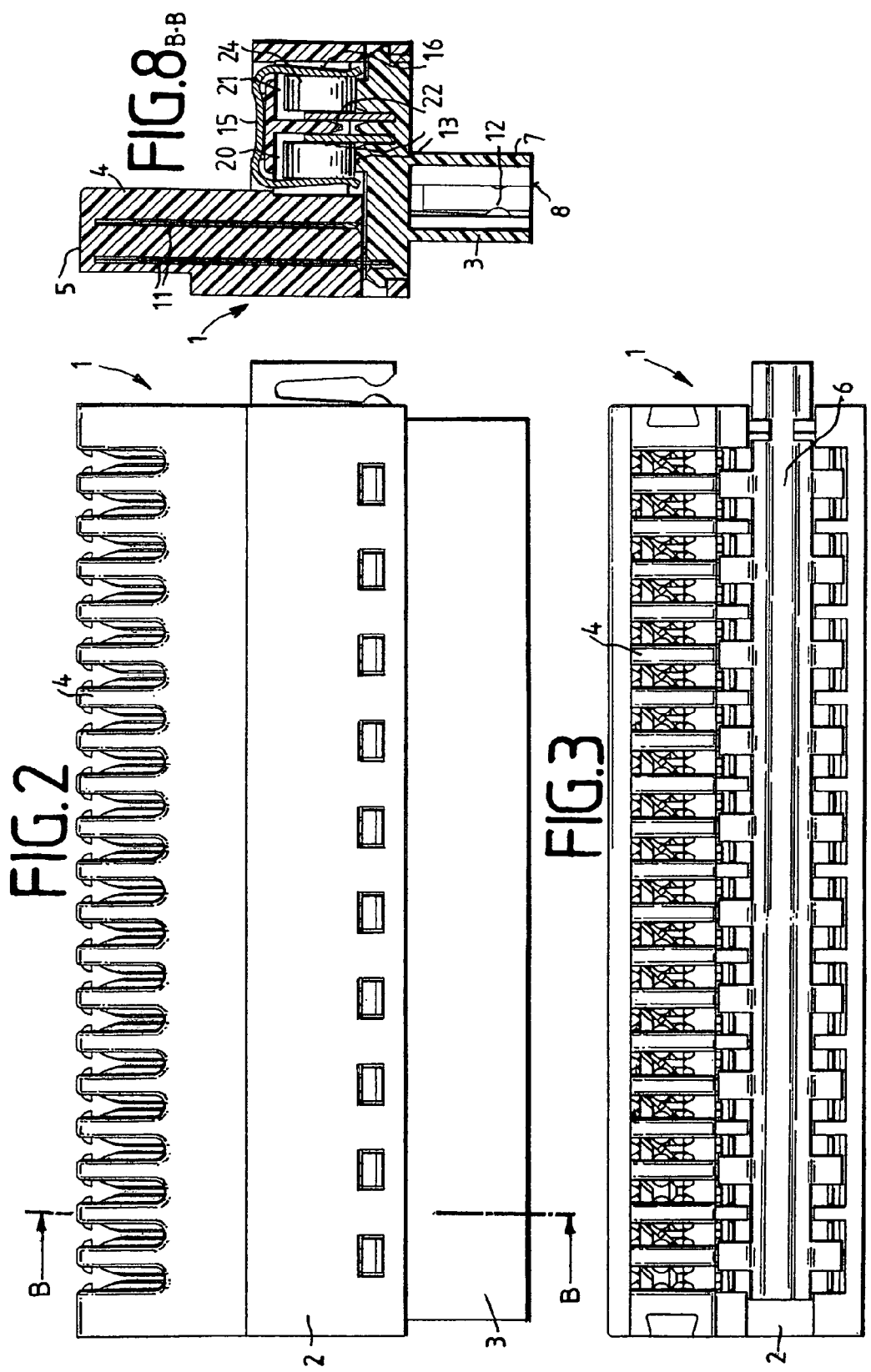

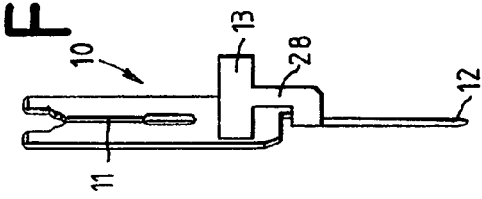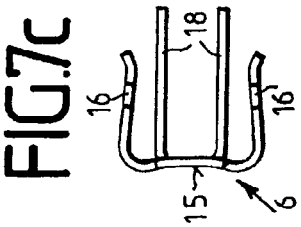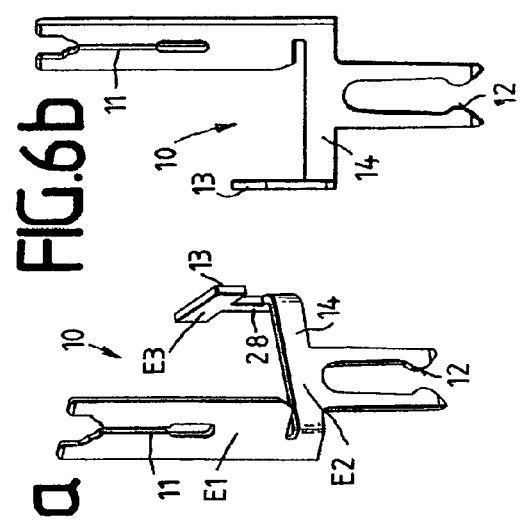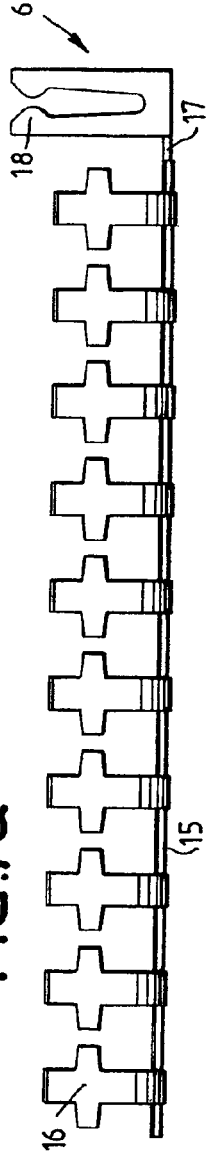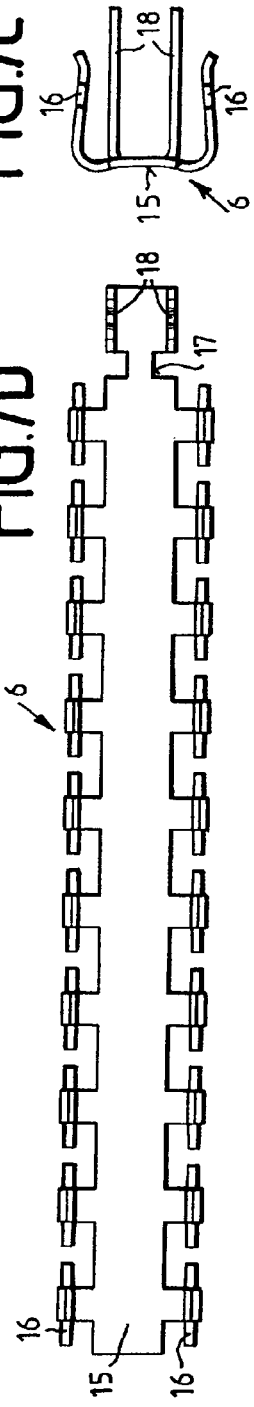

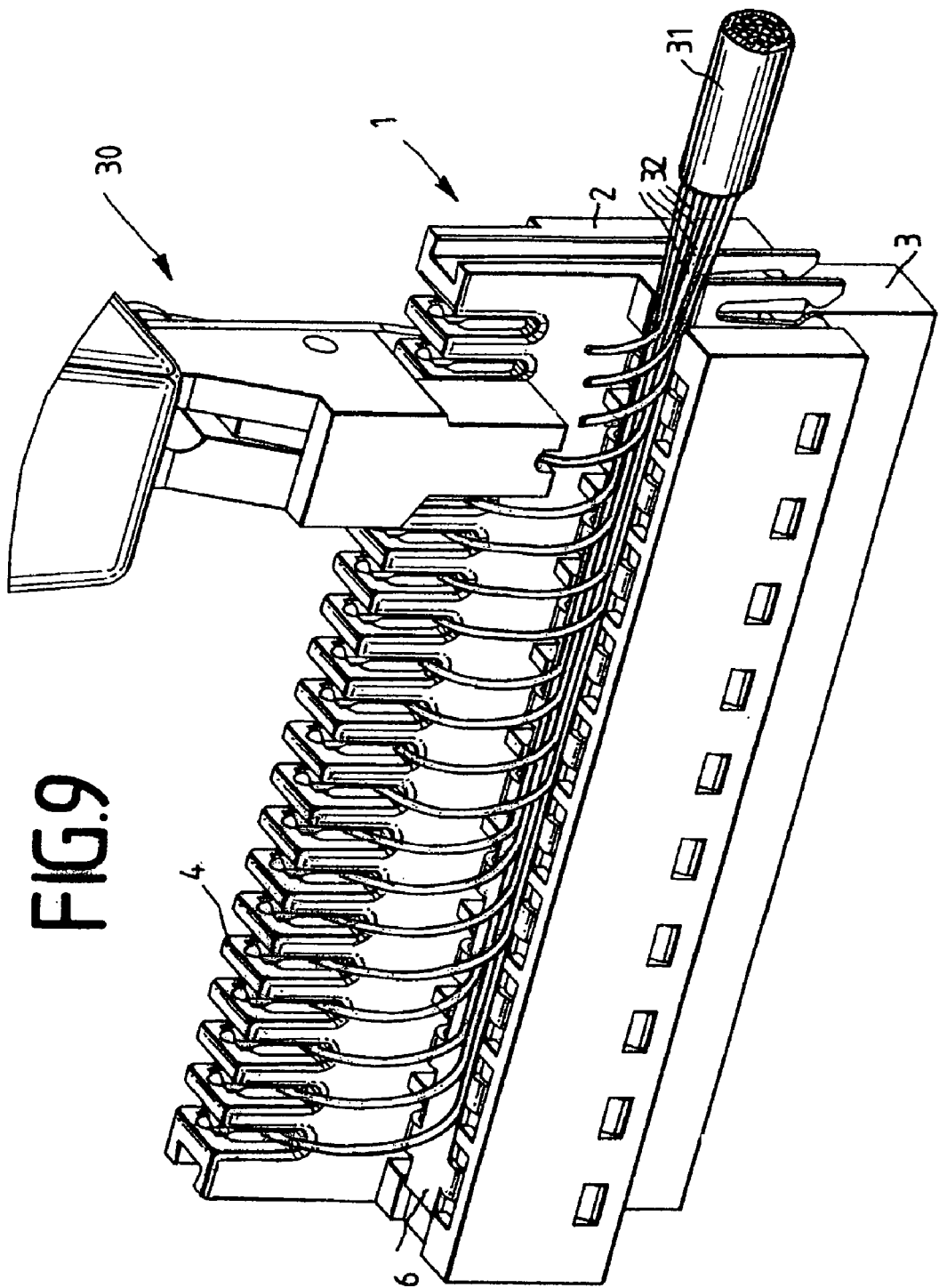

WIRE CONNECTION MODULE

TECHNICAL FIELD

The invention relates to a wire connection module.

BACKGROUND

DE 10 2004 017 605 B3 has disclosed a plug-type connector for printed circuit boards, comprising a number of contact elements, the contact elements each having two connection sides, one connection side being in the form of an insulation displacement contact for connecting wires, and the other connection side being in the form of a fork contact for making contact with connection pads on a printed circuit board, and a plastic housing, into which the insulation displacement contacts of the contact elements can be inserted, at least one lower edge of the insulation displacement contact being supported on the plastic housing, with the result that the contact elements are held in the plastic housing such that they cannot fall out in the event of connection forces occurring on the insulation displacement contacts, the plastic housing comprising at least one chamber-shaped region, and the fork contacts being accommodated completely in the longitudinal direction of the plastic housing, the contact element having two parts, the first part comprising the insulation displacement contact, and the second part comprising the fork contact, in each case one contact limb being arranged on both parts and the two contact limbs forming an isolation contact, the plastic housing having two pieces, the first housing part accommodating the insulation displacement contact, and the second housing part accommodating the fork contact, and both housing parts being latched to one another, the insulation displacement contact being supported on a slit clamping web of the second housing part, said fork contact lying in the slit of the clamping web, being supported in the interior of the second housing part and being clamped in by the first housing part. In this case, the isolation contact represents an interface via which, in addition to isolating plugs, surge protection plugs or magazines can also be connected.

SUMMARY OF THE INVENTION

The invention is based on the technical problem of providing a wire connection module which allows for improved integration of surge arresters.

The wire connection module comprises a two-part housing and a number of contact elements, the contact elements having at least one connection side, the one connection side being in the form of a contact for connecting wires, said contact element further having an interface via which surge protection elements can be connected, the first housing part being formed with receptacles into which two-pole surge arresters are inserted, the contact element having a contact face, which is in the form of an interface to the surge arrester, protrudes into the receptacle and makes contact with a first pole of the surge arrester, contact being made with the other pole of the surge arrester by means of a ground element. This results in a very compact connection module with an integrated surge protection. In particular, the connection module also does not require any printed circuit boards for integration of the surge arresters. Preferably, the contact element has a second connection side, which is in the form of a contact for a printed circuit board, the connection module preferably being in the form of a plug-type connector for printed circuit boards.

The pluggable contact for the printed circuit board is preferably in the form of a fork contact, which is particularly tolerant to faults with respect to fluctuations in the printed circuit board thickness or positional displacements of the contact elements.

In a further preferred embodiment, the contact element is formed in one piece, which, in addition to simple manufacture, also ensures improved transmission performance.

In a further preferred embodiment, in each case two receptacles are arranged in the transverse direction of the housing, which receptacles are separated by a common wall. As a result, although the width of the connection module or of the connector increases, on the other hand the length can be maintained. The two respective surge arresters in this case lie axially one behind the other, preferably the axial direction of the surge arresters being perpendicular to the direction in which they are plugged onto the printed circuit board or perpendicular to the side face of the housing.

In a further preferred embodiment, the ground element is in the form of a grounding comb, comprising a carrier, on which sprung contact lugs are arranged. Preferably, the contact lugs are arranged and formed in a sprung manner on the two longitudinal sides of the carrier.

In a further preferred embodiment, at least one grounding contact is arranged on at least one front side of the carrier, the grounding contact preferably being in the form of a fork contact or ring contact and further preferably being in the form of a double contact.

In a further preferred embodiment, the contact for connecting the wires is in the form of an insulation displacement contact, which is preferably positioned at an angle of 45° (+/−50) to the fork contact.

In a further preferred embodiment, the fork contact is aligned perpendicularly to the contact face of the contact element.

In a further preferred embodiment, the contact elements for the receptacles are designed differently, there being at least two differently designed contact elements.

Preferably, a web-shaped extension protrudes from the contact for the printed circuit board, preferably a fork contact, and/or from the contact for connecting the wires, which web-shaped extension is adjoined by the contact face for the surge arresters via a web, the web-shaped extension having different lengths for the contact elements. As a result, the contacts for the wires can be arranged in a row in the longitudinal direction, for example, but the surge arresters can be arranged at least in pairs in the transverse direction.

In a further preferred embodiment, the contact face of the contact elements is bent back from the web-shaped extension, the bend in the contact faces being in the opposite direction for two contact elements, i.e. one bend goes to the left and one bend goes to the right, for example. This allows for a tight arrangement of the contact elements and therefore a high connection density, since the bends of adjacent contact elements do not disrupt one another.

In a further preferred embodiment, the first housing part has raised webs, between which the insulation displacement contacts are guided, the webs being arranged in a row which extends in the longitudinal direction, the webs being raised with respect to the grounding comb in such a way that the lifting operation of a positioning tool is not impeded.

BRIEF DESCRIPTION OF THE DRAWINGS

The invention will be explained in more detail below with reference to a preferred exemplary embodiment. In the figures:

FIG. 2 shows a front view of the plug-type connector,

FIG. 3 shows a plan view of the plug-type connector,

FIGS. 6a-c show various perspective illustrations of a contact element,

FIG. 7a shows a front view of a grounding comb,

FIG. 7b shows a plan view of the grounding comb,

FIG. 7c shows a side view of the grounding comb,

FIG. 8 shows a cross section of the plug-type connector along the section line B-B shown in FIG. 2, and FIG. 9 shows a perspective front view of the plug-type connector with the positioning tool placed thereon.

DETAILED DESCRIPTION OF THE PREFERRED EMBODIMENT(S)

Figure 1:
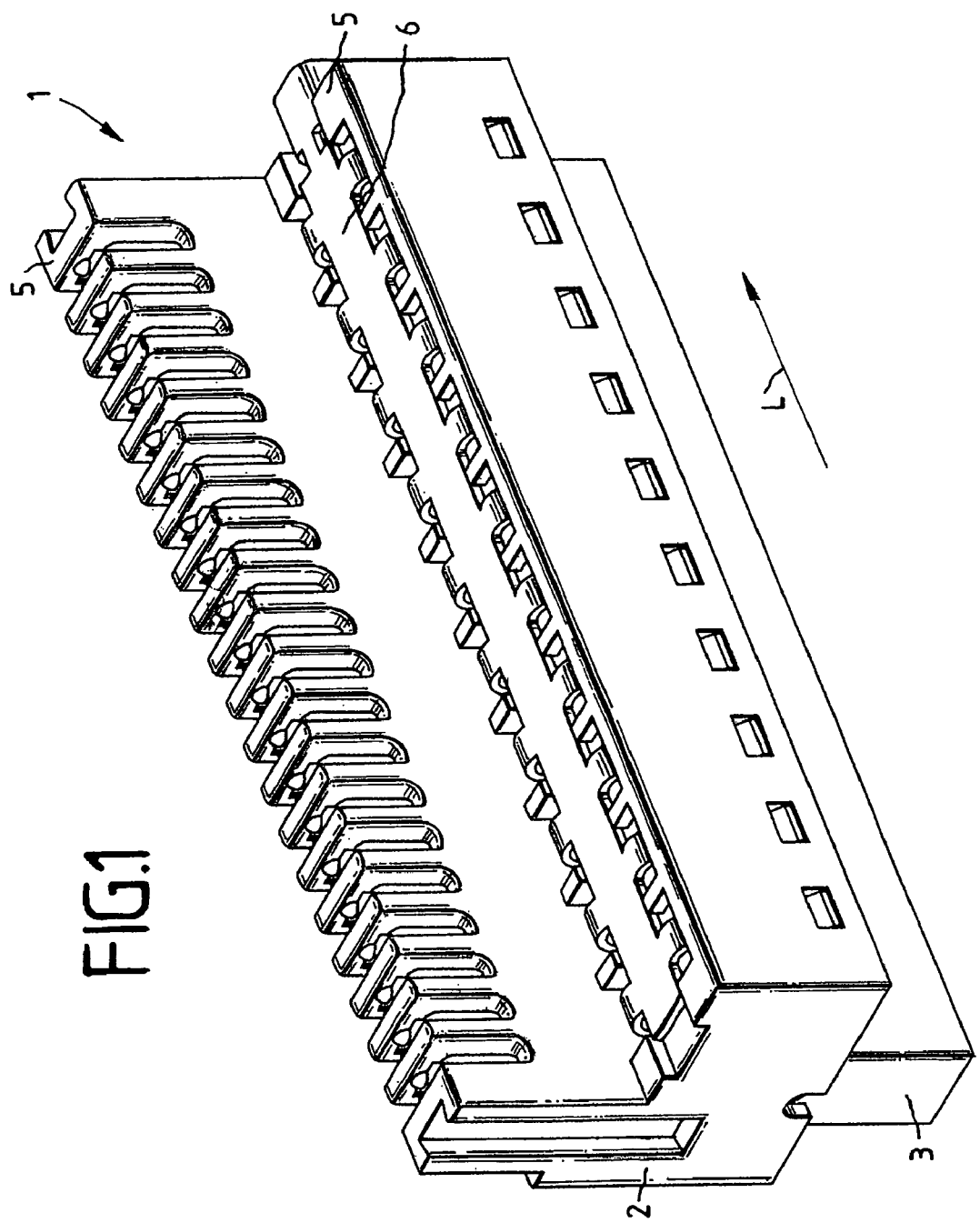
FIG. 1 shows a perspective front view of a plug-type connector for printed circuit boards.
Figure 4:
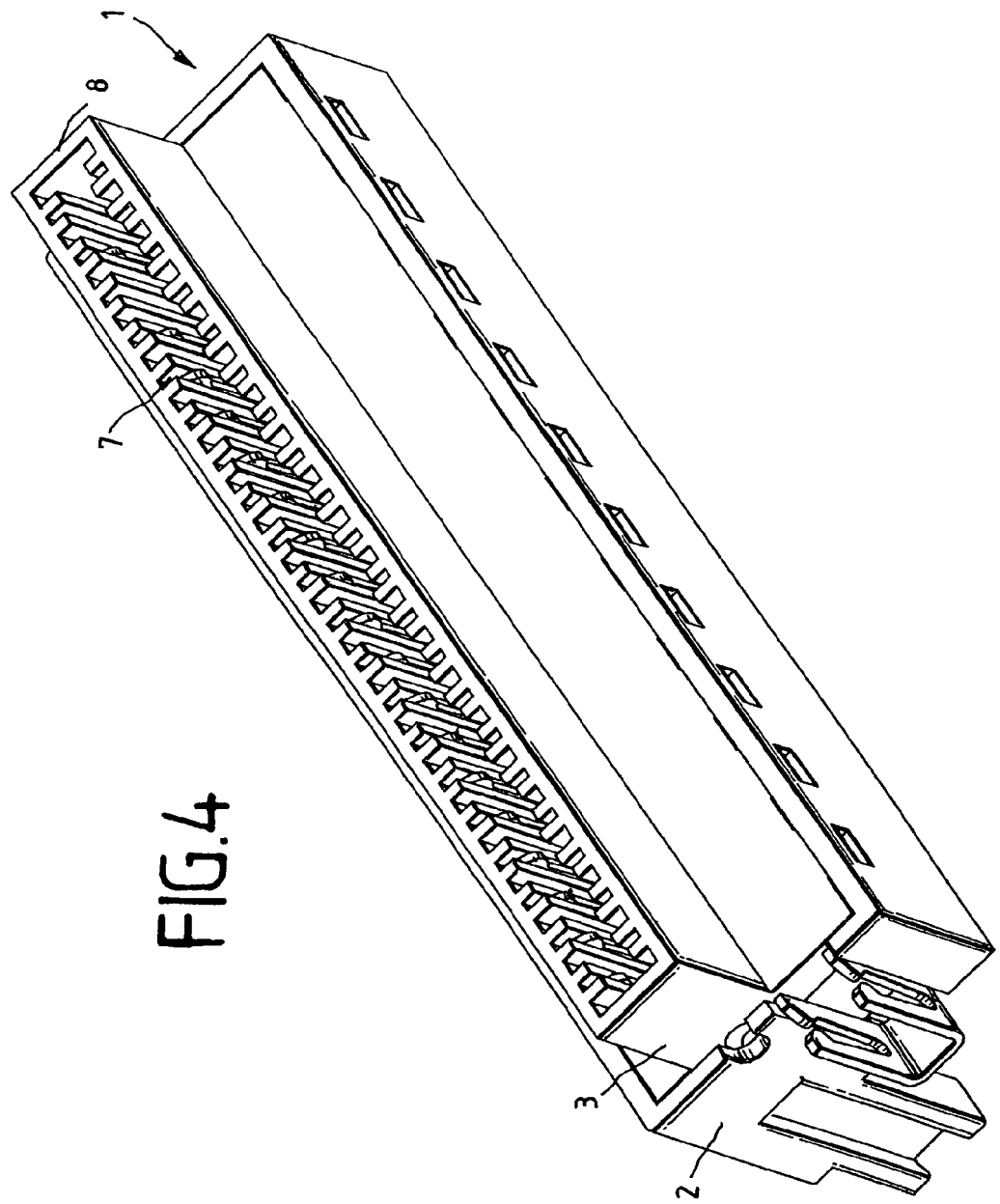
FIG. 4 shows a perspective view from below of the plug-type connector.

The plug-type connector 1 for printed circuit boards comprises a first housing part 2 and a second housing part 3, which are preferably connected to one another by a latching connection. The first housing part 2 has raised webs 4, between which insulation displacement contacts 11 of contact elements 10 (see FIGS. 6a-c) are guided. The webs 4 are arranged in a row which extends in the longitudinal direction L. In this case, webs 4 are arranged laterally offset with respect to the center line, the other side being positioned deeper. On this side of the upper side 5, the first housing part 2 has openings, into which a grounding comb 6 is inserted (see FIGS. 7a-c). The second housing part 3 is formed with guides 7, in which the fork contacts 12 of the contact elements 10 are guided, preferably the guides 7 completely accommodating the fork contacts 12, i.e. said fork contacts not protruding beyond the underside 8 of the second housing part 3.

Before the construction of the plug-type connector 1 is explained in more detail, the construction of the contact element 10 should first be explained in more detail with reference to FIGS. 6a-c and that of the grounding comb 6 with reference to FIGS. 7a-c.

The one-piece contact element 10 comprises an insulation displacement contact 11, a fork contact 12 and a contact face 13. In this case, the insulation displacement contact 11 and the fork contact 12 are aligned in opposite directions to one another, i.e. the insulation displacement contact 11 is accessible from the upper side 5 of the first housing part 2 and the fork contact 12 is accessible from the underside 8 of the second housing part 3. In this case, the plane E1 of the insulation displacement contact 11 is at an angle of 45° with respect to the plane E2 of the fork contact 12. A web-shaped extension 14 protrudes from the fork contact 12, this web-shaped extension then being adjoined by the contact face 13 via a web 28. The web 28 and the contact face 13 in this case form a T-shaped contact. In this case, the plane E3 of the contact face 13 is at a right angle with respect to the plane E2 of the fork contact 12. The width of the contact face 13 in this case ensures that the contact face 13 makes reliable contact with a two-pole surge arrester.

The grounding comb 6 comprises a carrier 15, which extends in the longitudinal direction L and on which laterally sprung contact lugs 16 are arranged. In this case, the contact lugs 16 are precisely opposite one another on the two longitudinal sides of the carrier 15. The sprung contact lugs 16 have a cruciform shape, with the result that, owing to the tapering towards the carrier 15, a sufficient spring effect is ensured. At the lower end, the contact lugs 16 are bent slightly outwards in order to therefore facilitate the plug-in operation into the first housing part 2.

A double fork contact 18, which extends in the same direction as the contact lugs 16, is arranged on a front side 17 of the carrier 15. The double fork contact 18 has the advantage that, in comparison with a single fork contact, more current is transmitted. There is also simpler fitting when latching-on the plug-type connector.

Figure 5:
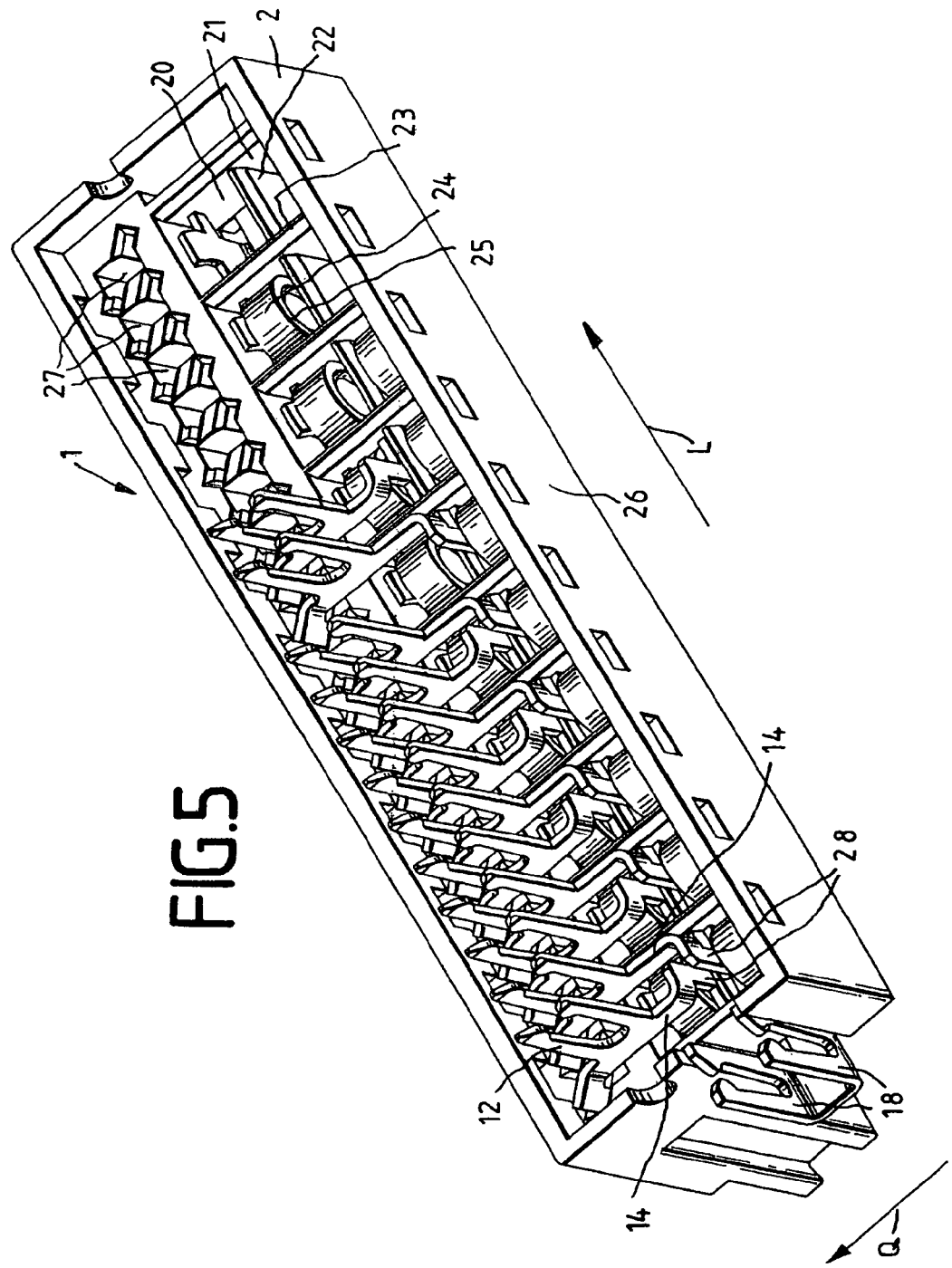
FIG. 5 shows a perspective view from below without the housing part.

FIG. 5 illustrates the plug-type connector 1 in a view from below without the second housing part 3. In the interior, the first housing part 2 is formed with receptacles 20, 21 and 27. In this case, the first housing part 2 comprises ten receptacles 20, ten receptacles 21 and twenty receptacles 27, the receptacles 20 and 21 each being arranged in a row extending in the longitudinal direction L. In this case, in each case one receptacle 20 and one receptacle 21 are associated with one another as a pair and are separated from one another by a wall 22, the two receptacles associated with one another as a pair extending in the form of a receptacle pair 20, 21 in the transverse direction Q. The receptacle pairs 20 and 21 of a row are separated from one another in the longitudinal direction L by a wall 23. Two-pole surge arresters 24 are arranged in the receptacles 20 and 21, which surge arresters essentially have a cylindrical shape. The two-pole surge arresters 24 are each formed on the base and lid with a contact (pole) 25 in the form of a circular ring, contact then being made with said surge arresters by the contact face 13 and the contact lugs 16 from both pole sides. For this purpose, the contact face 13 of a contact element 10 and a contact lug 16 of the grounding comb 6 in each case protrude into a receptacle 20, 21, the two contact faces 13 bearing, in the receptacles 20, 21, in each case on both sides against the wall 22 (see also FIG. 8). In this case, the contact faces 13 are relatively rigid. The contact elements 10 for the receptacles 20 and 21 also have different shapes. In the inserted state, the insulation displacement contacts 11 of all the contact elements 10 are aligned parallel to one another. The same applies to the fork contacts 12. However, the extension 14 of the contact elements 10 for the receptacles 21 is longer than that of the contact elements 10 for the receptacles 20. Furthermore, the bent-back portion of the contact face 13 is turned around. On the basis of the illustration in FIG. 5, the contact face 13 of the contact element 10 for the receptacle 20 is bent back from the extension 14 by 90° towards the right, whereas the contact face 13 of the contact element 10 with the longer extension for the receptacle 21 is bent back from the extension 14 through 90° towards the left.

In addition, twenty receptacles 27 for accommodating the insulation displacement contacts 11 are provided which likewise extend in the longitudinal direction L. In this case, in each case two receptacles 27 are associated with one receptacle pair 20, 21, aligned in the transverse direction Q.

FIG. 5 shows, in the left-hand region, a housing part 2 which has been completely fitted with contact elements 10. In the right-hand region, six contact elements 10 have been removed in the first three receptacle pairs 20, 21 in order to make the receptacles 20, 21 and 27 more visible. Furthermore, for this purpose the first receptacle pair 20, 21 is illustrated in the right-hand region of the housing part 2 and the receptacle 21 without the surge arresters 24 is illustrated in the second receptacle pair 20, 21 from the right. In the case of two receptacle pairs, 20, 21, in order to better illustrate the different lengths of the extensions 14 and the different bends in the webs 28 for the contact faces 13, in each case one contact element 10 with a longer and shorter extension 14 has been removed.

The two-pole surge arresters 24 are in this case aligned in the receptacles 20, 21 in such a way that the base and lid faces are aligned parallel to the side face 26 of the first housing part 2. In this case, note should be made of the fact that the receptacles 20 and 21 of a pair do not necessarily need to be aligned, but embodiments are also possible where these are offset with respect to one another.

Finally, FIG. 9 illustrates the plug-type connector 1 with a positioning tool 30 for wires 32 for making contact with the insulation displacement contacts 11. The webs 4 for the insulation displacement contacts 11 are raised with respect to the grounding comb 6 in such a way that the lifting operation of the positioning tool 30 is not impeded and sufficient space can be made available for the run of a cable 31 of the wires 32 with which contact has been made above the grounding comb 6.

LIST OF REFERENCE SYMBOLS

1 Plug-type connector
2 First housing part
3 Second housing part
4 Webs
5 Upper side
6 Grounding comb
7 Guides
8 Underside
10 Contact elements
11 Insulation displacement contact
12 Fork contact
13 Contact face
14 Extension
15 Carrier
16 Contact lugs
17 Front side
18 Double fork contact
20 Receptacles
21 Receptacles
22 Wall
23 Wall
24 Surge arresters
25 Contact
26 Side face
27 Receptacles
28 Web
30 Positioning tool
31 Cables
32 Wires
E1 Plane
E2 Plane
E3 Plane
L Longitudinal direction
Q Transverse direction

The invention claimed is:

1. A wire connection module, comprising:
a two-piece housing;
a ground element; and
a number of contact elements, each of the contact elements having at least one connection side configured to receive wires, a second connection side defining a fork contact configured to receive a printed circuit board, and an interface, via which surge protection elements can be connected,
wherein a first housing piece of the two-piece housing is formed with receptacles into which two-pole surge arresters are inserted,
wherein the interface of each contact element has a contact face, which protrudes into one of the receptacles-and makes contact with a first pole of one of the surge arresters,
wherein the ground element contacts a second pole of each surge arrester.

2. A wire connection module, comprising:
a two-part housing;
a ground element; and
a number of contact elements, each of the contact elements having at least one connection side, which is configured to receive wires, each contact element further having an interface, via which surge protection elements can be connected,
wherein a first housing part of the two-part housing is formed with receptacles into which two-pole surge arresters are inserted,
wherein the interface of each contact element has a contact face, which protrudes into one of the receptacles and makes contact with a first pole of one of the surge arresters,
wherein the ground element contacts a second pole of each surge arrester; and
wherein the contact elements are shaped differently.

3. The wire connection module as claimed in claim 1, wherein the wire connection module is in the form of a plug-type connector for printed circuit boards.

4. A wire connection module, comprising:
a two-part housing;
a ground element; and
a number of contact elements, each of the contact elements having at least one connection side, which is configured to receive wires, each contact element further having an interface, via which surge protection elements can be connected,
wherein a first housing part of the two-part housing is formed with receptacles into which two-pole surge arresters are inserted,
wherein the interface of each contact element has a contact face, which protrudes into one of the receptacles and makes contact with a first pole of one of the surge arresters,
wherein the ground element contacts a second pole of each surge arrester;
wherein the first connection side of each contact element is in the form of an insulation displacement contact; and
wherein the first housing part has raised webs, between which the insulation displacement contacts are guided, the webs being arranged in a row, which extends in a longitudinal direction of the first housing part, the webs being raised with respect to the grounding element in such a way that lifting of a positioning tool is not impeded.

5. The wire connection module as claimed in claim 1, wherein the contact element is formed in one piece.

6. The wire connection module as claimed in claim 1, wherein the housing defines two rows of receptacles separated by a common wall.

7. The wire connection module as claimed in claim 1, wherein the ground element is in the form of a grounding comb, comprising a carrier, on which sprung contact lugs are arranged.

8. The wire connection module as claimed in claim 7, wherein at least one grounding contact is arranged on at least one front side of the carrier.

9. The wire connection module as claimed in claim 8, wherein the grounding contact is in the form of a fork contact.

10. The wire connection module as claimed in claim 9, wherein the grounding contact is in the form of a double fork contact.

11. The wire connection module as claimed in claim 9, wherein the first connection side of each contact element is in the form of an insulation displacement contact.

12. The wire connection module as claimed in claim 11, wherein the insulation displacement contact is positioned at an angle of 45° with respect to the fork contact.

13. The wire connection module as claimed in claim 1, wherein the fork contact is aligned perpendicularly with respect to the contact face of each contact element.

14. The wire connection module as claimed in claim 1, wherein the contact elements are shaped differently.

15. The wire connection module as claimed in claim 14, wherein a web-shaped extension protrudes from the first connection side or the second connection side of each contact element, which extension is adjoined by the contact face via a web, the web-shaped extensions having different lengths.

16. The wire connection module as claimed in claim 15, wherein the contact face of each of the contact elements is bent back from the web-shaped extension, wherein the contact faces are bent back in opposition to one another.

17. The wire connection module as claimed in claim 11, wherein the first housing part has raised webs, between which the insulation displacement contacts are guided, the webs being arranged in a row, which extends in a longitudinal direction of the first housing piece, the webs being raised with respect to the grounding element in such a way that lifting of a positioning tool is not impeded.

18. The wire connection module as claimed in claim 8, wherein the grounding contact is in the form of a ring contact.

19. A wire connection module, comprising:
   a two-piece housing;
   a ground element; and
   a number of contact elements, each of the contact elements having at least one connection side, which is configured to receive wires, each contact element further having an interface, via which surge protection elements can be connected,
   wherein a first housing piece of the two-piece housing is formed with receptacles into which two-pole surge arresters are inserted,
   wherein the interface of each contact element has a contact face, which protrudes into one of the receptacles and makes contact with a first pole of one of the surge arresters,
   wherein the ground element contacts a second pole of each surge arrester; and
   wherein the ground element is in the form of a grounding comb, comprising a carrier, on which sprung contact lugs are arranged.

20. The wire connection module as claimed in claim 19, wherein at least one grounding contact is arranged on at least one front side of the carrier.

21. The wire connection module as claimed in claim 20, wherein the grounding contact is in the form of a fork contact or ring contact.

22. The wire connection module as claimed in claim 21, wherein the grounding contact is in the form of a double fork contact.

23. A wire connection module, comprising:
   a two-part housing;
   a ground element; and
   a number of contact elements, each of the contact elements having at least one connection side, which is configured to receive wires, each contact element further having an interface, via which surge protection elements can be connected,
   wherein a first housing part of the two-part housing is formed with receptacles into which two-pole surge arresters are inserted,
   wherein the interface of each contact element has a contact face, which protrudes into one of the receptacles and makes contact with a first pole of one of the surge arresters,
   wherein the ground element contacts a second pole of each surge arrester;
   wherein each contact element has a second connection side, which is configured to receive a printed circuit board;
   wherein the second connection side of each contact element is in the form of a fork contact; and
   wherein the fork contact is aligned perpendicularly with respect to the contact face of each contact element.

* * * * *

UNITED STATES PATENT AND TRADEMARK OFFICE
CERTIFICATE OF CORRECTION

| | | |
|---|---|---|
| PATENT NO. | : 8,016,617 B2 | Page 1 of 1 |
| APPLICATION NO. | : 12/134012 | |
| DATED | : September 13, 2011 | |
| INVENTOR(S) | : Neumetzler | |

It is certified that error appears in the above-identified patent and that said Letters Patent is hereby corrected as shown below:

Col. 2, line 30: "(+/- 50) to the fork" should read --(+/- 5°) to the fork--

Signed and Sealed this
Tenth Day of April, 2012

David J. Kappos
*Director of the United States Patent and Trademark Office*